(12) United States Patent
Oguma

(10) Patent No.: US 10,797,364 B2
(45) Date of Patent: Oct. 6, 2020

(54) POWER SUPPLY SYSTEM OF VEHICLE

(71) Applicant: Honda Motor Co.,Ltd., Tokyo (JP)

(72) Inventor: Hirokazu Oguma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 33 days.

(21) Appl. No.: 16/368,888

(22) Filed: Mar. 29, 2019

(65) Prior Publication Data

US 2019/0305393 A1 Oct. 3, 2019

(30) Foreign Application Priority Data

Mar. 30, 2018 (JP) .................................. 2018-066995

(51) Int. Cl.
| | |
|---|---|
| *H01M 10/63* | (2014.01) |
| *B60L 53/00* | (2019.01) |
| *H02J 7/00* | (2006.01) |
| *H01M 10/625* | (2014.01) |
| *H01M 10/615* | (2014.01) |
| *H01M 10/657* | (2014.01) |
| *H01M 10/48* | (2006.01) |
| *B60L 58/27* | (2019.01) |
| *B60L 58/18* | (2019.01) |

(Continued)

(52) U.S. Cl.
CPC ............. *H01M 10/63* (2015.04); *B60L 50/66* (2019.02); *B60L 53/00* (2019.02); *B60L 58/18* (2019.02); *B60L 58/27* (2019.02); *H01M 10/486* (2013.01); *H01M 10/615* (2015.04); *H01M 10/625* (2015.04); *H01M 10/657* (2015.04); *H02J 7/0021* (2013.01); *B60Y 2200/91* (2013.01); *B60Y 2300/91* (2013.01); *H01M 2220/20* (2013.01); *H02P 27/08* (2013.01)

(58) Field of Classification Search
CPC .. H01M 10/63; H01M 10/615; H01M 10/625; H01M 10/657; H01M 10/486; B60L 53/00; B60L 58/27; B60L 58/18; B60L 50/66; B60Y 2200/91; B60Y 2300/91; H02P 27/08
See application file for complete search history.

(56) References Cited

U.S. PATENT DOCUMENTS

| | | | | |
|---|---|---|---|---|
| 8,816,646 | B2 * | 8/2014 | Kamijima | ............. H02J 7/0091 320/150 |
| 9,337,680 | B2 * | 5/2016 | Gibeau | .................... B60L 58/26 |
| 9,533,585 | B2 * | 1/2017 | Murata | ............... H01M 10/615 |

FOREIGN PATENT DOCUMENTS

JP  2016063645  4/2016

* cited by examiner

*Primary Examiner* — Dinh T Le
(74) *Attorney, Agent, or Firm* — JCIPRNET

(57) ABSTRACT

A power supply system includes: a first battery; a second battery; a heater; a power circuit in which the first battery and the second battery and the heater are provided; a first external charging unit supplying electric power external to a vehicle to the power circuit; and an electronic control unit controlling the power circuit and the first external charging unit. During execution of heater heating control that heats the first battery with the heater by driving the heater with the electric power supplied from the first external charging unit, the electronic control unit executes discharging heating control that heats the first battery by discharging electric power from the first battery to the second battery, and charges the first battery with the electric power supplied from the first external charging unit after a temperature of the first battery becomes equal to or higher than a heating determination temperature.

5 Claims, 6 Drawing Sheets

(51) Int. Cl.
*B60L 50/60* (2019.01)
*H02P 27/08* (2006.01)

POWER SUPPLY SYSTEM OF VEHICLE

CROSS-REFERENCE TO RELATED APPLICATION

This application claims the priority benefit of Japan Application No. 2018-066995, filed on Mar. 30, 2018. The entirety of the above-mentioned patent application is hereby incorporated by reference herein and made a part of this specification.

BACKGROUND

Technical Field

The disclosure relates to a power supply system of a vehicle. More specifically, the disclosure relates to a power supply system of a vehicle, the power supply system including two power storage devices, a heating device consuming electric power and heating the power storage devices, and an external power supply part supplying external electric power.

Related Art

An electric vehicle travels by driving a motor using electric power supplied from a power storage device. For this power storage device, chemical cells such as lithium ion batteries or nickel hydrogen batteries and the like are often used. However, since chemical cells convert chemical energy into direct current (DC) power by chemical reaction, they have a characteristic of deteriorating in both charging capacity and discharging capacity as their temperature falls.

Therefore, in the case of charging the power storage device by an external charger in a low temperature environment, it is often to drive a heater mounted on the vehicle with electric power supplied from the external charger and charge the power storage device while heating the same (e.g., see Patent Document 1).

PATENT DOCUMENTS

Patent Document 1: Japanese Laid-open No. 2016-63645

However, with the heater provided outside the power storage device, even if the outside of the power storage device can be heated, the inside of the power storage device cannot be sufficiently heated. Hence, in the power supply system of Patent Document 1, there is a fear that it may take time to heat the inside of the power storage device to recover the charging capacity. In addition, during external charging, even if heating by the heater and charging to the power storage device are simultaneously performed, if the internal temperature of the power storage device is low and the charging capacity is not sufficient, since charging power that can be supplied to the power storage device is also limited, there is a fear that it may take time to complete the charging.

SUMMARY

The disclosure provides a power supply system of a vehicle, capable of promptly charging a power storage device with externally supplied electric power in a low temperature environment.

A power supply system (e.g., a later-described power supply system 1) of a vehicle (e.g., a later-described vehicle V) according to the disclosure includes: a first power storage device (e.g., a later-described first battery B1) and a second power storage device (e.g., a later-described second battery B2), supplying electric power to a power source (e.g., a later-described drive motor M) of the vehicle; a heating device (e.g., a later-described heater H), consuming the electric power and heating the first power storage device; a power circuit (e.g., a later-described power circuit 2) in which the first power storage device, the second power storage device and the heating device are provided; an external power supply part (e.g., a later-described first external charging unit 5 or second external charging unit 6), supplying electric power external to the vehicle to the power circuit; a control device (e.g., a later-described ECU 7), controlling the power circuit and the external power supply part; and a temperature acquisition unit (e.g., a later-described first battery sensor unit 81), acquiring a temperature of the first power storage device, wherein, during execution of first heating control that heats the first power storage device with the heating device by driving the heating device with the electric power supplied from the external power supply part, the control device executes second heating control that heats the first power storage device by discharging electric power from one of the first power storage device and the second power storage device to the other of the first power storage device and the second power storage device, and charges the first power storage device with the electric power supplied from the external power supply part after the temperature of the first power storage device becomes equal to or higher than a predetermined temperature (e.g., a later-described heating determination temperature).

DESCRIPTION OF THE EMBODIMENTS

Figure 1:
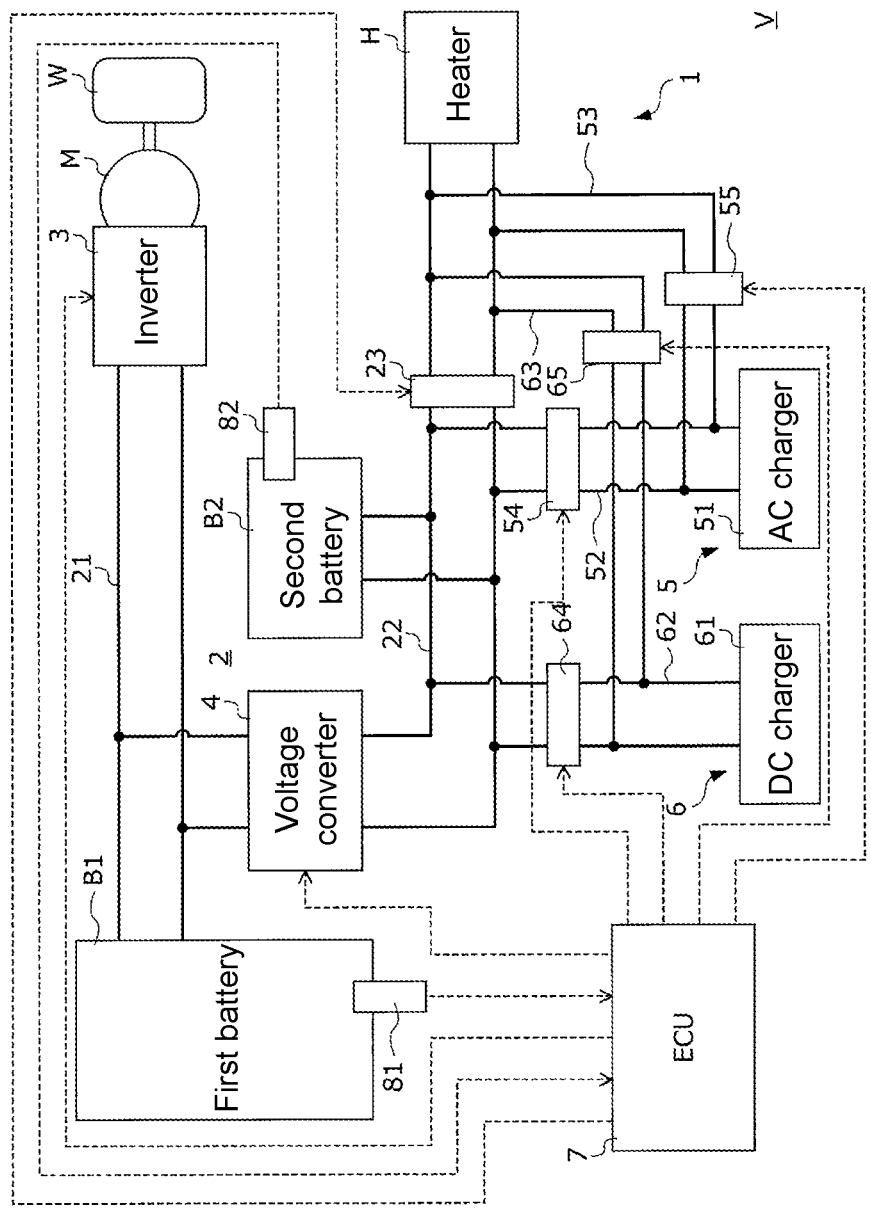
FIG. 1 illustrates a configuration of a vehicle mounted with a power supply system according to an embodiment of the disclosure.

According to an embodiment of the disclosure, the first power storage device has lower output weight density and higher energy weight density than the second power storage device, and in the second heating control, after firstly performing discharging heating control that heats the first power storage device by discharging electric power from the first power storage device to the second power storage device, the control device performs charging heating control that heats the first power storage device by discharging electric power from the second power storage device to the first power storage device and charging the first power storage device.

According to an embodiment of the disclosure, in the second heating control, the control device repeatedly executes the discharging heating control and the charging heating control until the temperature of the first power storage device becomes equal to or higher than the predetermined temperature.

According to an embodiment of the disclosure, during a travel of the vehicle, the control device controls charging/discharging of the second power storage device so that storage capacity of the second power storage device is maintained equal to or less than normal upper limit storage capacity, and in the discharging heating control, the control device discharges electric power from the first power storage device to the second power storage device until the storage capacity of the second power storage device reaches heating upper limit storage capacity greater than the normal upper limit storage capacity.

In the power supply system of the disclosure, the control device executes the second heating control during execution of the first heating control, and charges the first power storage device with the electric power supplied from the external power supply part after the temperature of the first power storage device becomes equal to or higher than the predetermined temperature. Here, in the first heating control, the control device externally heats the first power storage device by driving the heating device with the electric power supplied from the external power supply part. Also, in the second heating control, the control device internally heats the first power storage device by discharging electric power from one of the first power storage device and the second power storage device to the other of the first power storage device and the second power storage device. Thus, in the power supply system, since the first power storage device can be heated both internally and externally by simultaneously executing the first heating control and the second heating control, the charging capacity and discharging capacity of the first power storage device can be promptly raised. In addition, according to the power supply system, by supplying the electric power from the external power supply part to the first power storage device after the temperature of the first power storage device has become equal to or higher than the predetermined temperature, in the first heating control, the electric power supplied from the external power supply part can be largely supplied to the heating device. Thus, the first power storage device can be promptly heated, and the charging capacity and discharging capacity of the first power storage device can be promptly raised. Also, accordingly, time required for charging the first power storage device can be shortened.

In the power supply system of the disclosure, as the first power storage device, one having lower output weight density and higher energy weight density than the second power storage device is used. That is, the first power storage device superior in energy weight density is a capacity type power storage device mainly aiming for high capacity, and the second power storage device superior in output weight density is an output type power storage device mainly aiming for high output. Since the capacity type first power storage device has higher discharging capacity than charging capacity at a low charging rate where charging is required, the amount of heat generated by internal resistance can be increased by performing discharging rather than charging, and the first power storage device can be promptly heated. Thus, in the second heating control, after firstly performing the discharging heating control that heats the first power storage device by discharging electric power from the first power storage device to the second power storage device, the control device performs the charging heating control that heats the first power storage device by discharging electric power from the second power storage device to the first power storage device and charging the first power storage device. Accordingly, the temperature of the first power storage device can be promptly raised to the predetermined temperature, and the time required for charging the first power storage device can be shortened.

In the power supply system of the disclosure, in the second heating control, the discharging heating control and the charging heating control are repeatedly executed until the temperature of the first power storage device reaches the predetermined temperature. Accordingly, since the first power storage device can be continuously internally heated, the temperature of the first power storage device can be promptly raised to the predetermined temperature, and the time required for charging the first power storage device can be shortened.

As described above, since the discharging heating control is capable of promptly heating the first power storage device as compared to the charging heating control, the discharging heating control is preferably performed first. However, in order to perform the discharging heating control, it is necessary to receive the electric power discharged from the first power storage device with the second power storage device. Therefore, in the power supply system of the disclosure, during a travel of the vehicle, the control device controls a charging/discharging amount of the second power storage device so that storage capacity of the second power storage device is maintained equal to or less than the normal upper limit storage capacity, and in the discharging heating control, the control device discharges electric power from the first power storage device to the second power storage device until the storage capacity of the second power storage device reaches the heating upper limit storage capacity greater than the normal upper limit storage capacity. Accordingly, in the discharging heating control firstly performed as above, since the electric power discharged from the first power storage device can be received by the second power storage device, the first power storage device can be promptly heated.

Hereinafter, one embodiment of the disclosure is explained with reference to the drawings.

FIG. 1 illustrates a configuration of an electric vehicle (hereinafter simply "vehicle") V mounted with a power supply system 1 according to the present embodiment. The vehicle V includes the power supply system 1, a drive motor M being a motor generator, and a driving wheel W.

The drive motor M mainly generates power for running the vehicle V. An output shaft of the drive motor M is connected to the driving wheel W via a power transmission mechanism (not shown). A torque generated by the drive motor M due to a supply of electric power from the power supply system 1 to the drive motor M is transmitted to the driving wheel W via the power transmission mechanism (not shown), rotating the driving wheel W and causing the vehicle V to travel. In addition, the drive motor M acts as an electrical generator during deceleration regeneration of the vehicle V. The electric power generated by the drive motor M is charged into a first battery B1 and a second battery B2 (both described later) included in the power supply system 1.

The power supply system 1 includes: the first battery B1 as a first power storage device and the second battery B2 as a second power storage device, supplying electric power to the drive motor M; a heater H as a heating device, consuming the electric power and heating the first battery B1; a power circuit 2 in which the first battery B1, the second battery B2, the heater H and the drive motor M are provided;

a first external charging unit 5 and a second external charging unit 6, supplying externally supplied electric power to the power circuit 2; and an electronic control unit 7 (hereinafter abbreviated as "ECU 7"), controlling the power circuit 2, the first external charging unit 5 and the second external charging unit 6.

The first battery B1 is a secondary battery capable of both discharging that converts chemical energy into electrical energy and charging that converts electrical energy into chemical energy. Hereinafter, a case is explained where a so-called lithium ion battery which performs charging/discharging by moving lithium ions between electrodes is used as the first battery B1, but the disclosure is not limited thereto.

In the first battery B1, a first battery sensor unit 81 is provided for estimating an internal state of the first battery B1. The first battery sensor unit 81 is composed of a plurality of sensors that detect physical quantities necessary for acquiring a charging rate or temperature or the like of the first battery B1 in the ECU 7 and transmit a signal corresponding to a detected value to the ECU 7. More specifically, the first battery sensor unit 81 is composed of a voltage sensor detecting a terminal voltage of the first battery B1, a current sensor detecting a current flowing through the first battery B1, and a temperature sensor detecting the temperature of the first battery B1, and the like. The ECU 7 calculates the charging rate which represents battery storage capacity in percentage based on a known algorithm using the detected value transmitted from the first battery sensor unit 81. The ECU 7 also acquires the temperature of the first battery B1 based on the detected value transmitted from the first battery sensor unit 81.

The second battery B2 is a secondary battery capable of both discharging that converts chemical energy into electrical energy and charging that converts electrical energy into chemical energy. Hereinafter, a case is explained where a so-called lithium ion battery which performs charging/discharging by moving lithium ions between electrodes is used as the second battery B2, but the disclosure is not limited thereto. For example, a capacitor may be used as the second battery B2.

In the second battery B2, a second battery sensor unit 82 is provided for estimating an internal state of the second battery B2. The second battery sensor unit 82 is composed of a plurality of sensors that detect physical quantities necessary for acquiring a charging rate or temperature or the like of the second battery B2 in the ECU 7 and transmit a signal corresponding to a detected value to the ECU 7. More specifically, the second battery sensor unit 82 is composed of a voltage sensor detecting a terminal voltage of the second battery B2, a current sensor detecting a current flowing through the second battery B2, and a temperature sensor detecting the temperature of the second battery B2, and the like. The ECU 7 calculates the charging rate of the second battery B2 based on a known algorithm using the detected value transmitted from the second battery sensor unit 82. The ECU 7 also acquires the temperature of the second battery B2 based on the detected value transmitted from the second battery sensor unit 82.

Herein, characteristics of the first battery B1 and characteristics of the second battery B2 are compared.

First, a full charge voltage of the first battery B1 is higher than a full charge voltage of the second battery B2. Hence, during a travel of the vehicle V, or during charging of the first battery B1 and the second battery B2 using the first external charging unit 5 or the second external charging unit 6, a voltage of a later-described first power line 21 directly connected to the first battery B1 is higher than a voltage of a second power line 22 directly connected to the second battery B2.

Also, the first battery B1 has lower output weight density and higher energy weight density than the second battery B2. That is, the first battery B1 is superior to the second battery B2 in terms of energy weight density. Also, the second battery B2 is superior to the first battery B1 in terms of output weight density. The energy weight density refers to electrical energy per unit weight [Wh/kg], and the output weight density refers to electric power per unit weight [W/kg]. Therefore, the first battery B1 superior in energy weight density is a capacity type power storage device mainly aiming for high capacity, and the second battery B2 superior in output weight density is an output type power storage device mainly aiming for high output.

Figure 2:
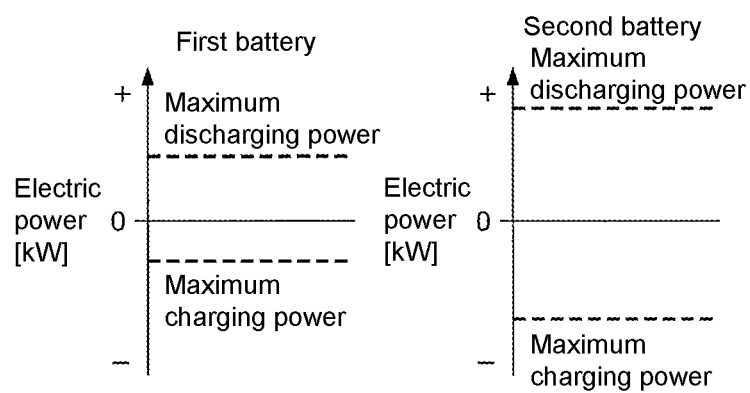
FIG. 2 is a diagram comparing discharging capacity and charging capacity of a first battery and a second battery at a predetermined temperature.

FIG. 2 is a diagram comparing discharging capacity and charging capacity of the first battery B1 and the second battery B2 at a predetermined temperature. On the left side of FIG. 2, a maximum discharging power [kW] and a maximum charging power [kW] of the first battery B1 at the predetermined temperature are shown; on the right side of FIG. 2, the maximum discharging power and the maximum charging power of the second battery B2 at the same predetermined temperature are shown. The maximum discharging power refers to a maximum value of electric power that can be continuously discharged from a battery, and is hereinafter assumed to be a positive value. The maximum charging power refers to a maximum value of electric power that can be continuously supplied to a battery, and is hereinafter assumed to be a negative value.

As shown in FIG. 2, the maximum discharging power of the first battery B1 is smaller than the maximum discharging power of the second battery B2. That is, the second battery B2 is capable of continuously discharging larger electric power than that of the first battery B1. Also, an absolute value of the maximum charging power of the second battery B2 is greater than an absolute value of the maximum charging power of the first battery B1. That is, the second battery B2 has higher regenerative capacity than the first battery B1. Moreover, in both the first battery B1 and the second battery B2, the maximum discharging power and the maximum charging power have a characteristic of approaching 0 as the temperature of the first battery B1 and the second battery B2 falls.

The heater H is installed in the vicinity of the first battery B1. The heater H is an electric heater consuming electric power at the later-described second power line 22 to generate heat and heating the first battery B1.

The power circuit 2 includes: an inverter 3 exchanging electric power with the drive motor M; the first power line 21 connecting a DC input/output terminal of the inverter 3 with the first battery B1; the second power line 22 connected to the second battery B2 and the heater H; and a voltage converter 4 connecting the second power line 22 with the first power line 21.

The inverter 3 is, for example, a pulse width modulated (PWM) inverter including a bridge circuit composed of a plurality of bridge-connected switching elements (e.g., insulated-gate bipolar transistors (IGBTs)), and has a function of converting DC power and alternate current (AC) power. The inverter 3 is connected to the first power line 21 on its DC input/output side, and is connected to a U-phase coil, a V-phase coil and a W-phase coil of the drive motor M on its AC input/output side. By on/off driving switching elements of each phase in accordance with a gate driving signal generated from a gate drive circuit (not shown) of the ECU 7 at a predetermined timing, the inverter 3 may convert the DC power at the first power line 21 into three-phase AC power and supply it to the drive motor M, or may convert the three-phase AC power supplied from the drive motor M into DC power and supply it to the first power line 21.

The voltage converter 4 connects the first power line 21 with the second power line 22. The voltage converter 4 is a so-called bidirectional DCDC converter, formed by combining a reactor, a smoothing capacitor, and a plurality of switching elements (e.g., IGBTs) and so on, and converting a DC voltage between the first power line 21 and the second power line 22. By on/off driving the above switching elements in accordance with the gate driving signal generated from the gate drive circuit (not shown) of the ECU 7 at a predetermined timing, the voltage converter 4 exhibits a step-up function and a step-down function. The step-up function refers to a function of stepping up electric power at the second power line 22 on a low voltage side and outputting it to the first power line 21; accordingly, a current flows from the side of the second power line 22 to the side of the first power line 21. The step-down function refers to a function of stepping down electric power at the first power line 21 on a high voltage side and outputting it to the second power line 22; accordingly, a current flows from the side of the first power line 21 to the side of the second power line 22.

The second battery B2 is connected to a side of the second power line 22 closer to the voltage converter 4 than to the heater H. In the second power line 22, a heater contactor 23 being a switch connecting the heater H to or disconnecting the heater H from the second battery B2 and the voltage converter 4 is provided between the second battery B2 and the heater H. The heater contactor 23 is closed or opened according to a signal transmitted from the ECU 7. Therefore, the second power line 22 can be divided into a circuit including the voltage converter 4 and the second battery B2 and a circuit including the heater H, by opening the heater contactor 23.

The first external charging unit 5 includes an AC charger 51, a charging line 52, a heater feeding line 53, a charging contactor 54, and a heater feeding contactor 55.

The AC charger 51 converts AC power supplied from, for example, a commercial AC power supply for home use (not shown) into DC power and supplies it to the charging line 52 and the heater feeding line 53.

The charging line 52 is a power line connecting an output terminal of the AC charger 51 with a side of the second power line 22 closer to the second battery B2 than to the heater contactor 23. In the case where the first battery B1 or the second battery B2 is charged with the electric power supplied from the AC charger 51, the charging line 52 is used. The charging contactor 54 is a switch provided in the charging line 52 and connects the AC charger 51 to or disconnects the AC charger 51 from the second battery B2 and the voltage converter 4. The charging contactor 54 is closed or opened according to a signal transmitted from the ECU 7.

The heater feeding line 53 is a power line connecting the output terminal of the AC charger 51 with a side of the second power line 22 closer to the heater H than to the heater contactor 23. In the case where the heater H is driven with the electric power supplied from the AC charger 51, the heater feeding line 53 is used. The heater feeding contactor 55 is a switch provided in the heater feeding line 53 and connects or disconnects the AC charger 51 and the heater H. The heater feeding contactor 55 is closed or opened according to a signal transmitted from the ECU 7.

The second external charging unit 6 includes a DC charger 61, a charging line 62, a heater feeding line 63, a charging contactor 64, and a heater feeding contactor 65.

The DC charger 61 supplies DC power supplied from, for example, an external quick charger (not shown) installed in a charging station, a commercial facility, and a public facility or the like, to the charging line 62 and the heater feeding line 63.

The charging line 62 is a power line connecting an output terminal of the DC charger 61 with a side of the second power line 22 closer to the second battery B2 than to the heater contactor 23. In the case where the first battery B1 or the second battery B2 is charged with the electric power supplied from the DC charger 61, the charging line 62 is used. The charging contactor 64 is a switch provided in the charging line 62 and connects the DC charger 61 to or disconnects the DC charger 61 from the second battery B2 and the voltage converter 4. The charging contactor 64 is closed or opened according to a signal transmitted from the ECU 7.

The heater feeding line 63 is a power line connecting the output terminal of the DC charger 61 with a side of the second power line 22 closer to the heater H than to the heater contactor 23. In the case where the heater H is driven with the electric power supplied from the DC charger 61, the heater feeding line 63 is used. The heater feeding contactor 65 is a switch provided in the heater feeding line 63 and connects or disconnects the DC charger 61 and the heater H. The heater feeding contactor 65 is closed or opened according to a signal transmitted from the ECU 7.

The ECU 7 is a microcomputer, wherein, during a travel and during external charging of the first battery B1 and the second battery B2, the ECU 7 controls charging/discharging of the first battery B1 and the second battery B2 by operating the inverter 3, the voltage converter 4, the heater contactor 23, the first external charging unit 5 and the second external charging unit 6, and so on.

First, an outline of charging/discharging control of the first battery B1 and the second battery B2 by the ECU 7 during a travel of the vehicle V is explained.

As described above, the first battery B1 is of the capacity type, and the second battery B2 is of the output type. Therefore, in cases where the electric power required by the drive motor M is relatively small, such as during a constant speed travel or during gradual acceleration or the like, the ECU 7 turns off the voltage converter 4 and supplies the electric power discharged from the first battery B1 to the drive motor M. In cases where the electric power required by the drive motor M cannot be supplied by the first battery B1 alone, such as during acceleration or during hill climbing, by driving the voltage converter 4, electric power discharged from the second battery B2 in addition to the first battery B1 is supplied to the drive motor M.

In this way, when a request is made by a driver, the second battery B2 is used to complement the output of the first battery B1 in response to the request. Therefore, in order to always be able to respond to requests made by the driver, the charging rate of the second battery B2 is preferably maintained at a predetermined normal lower limit charging rate (e.g., about 20% to 50%) or higher. As a means of maintaining the charging rate of the second battery B2 at the normal lower limit charging rate or higher in this way, for example, all the regenerative power generated by the drive motor M may be temporarily charged into the first battery B1, and then, the second battery B2 may be charged with the electric power discharged from the first battery B1, if necessary. However, compared to the case where the regenerative power generated by the drive motor M is charged directly into the second battery B2 via the voltage converter 4, in this case, loss is larger since the first battery B1 undergoes charging and discharging. Therefore, the ECU 7 drives the voltage converter 4 so that the regenerative power generated by the drive motor M during deceleration is largely charged into the second battery B2 in preference to the first battery B1.

In this way, in the power supply system 1, the regenerative power generated by the drive motor M during deceleration is largely charged into the second battery B2 in preference to the first battery B1. Hence, an upper limit is also set on the charging rate of the second battery B2 so that the regenerative power generated during deceleration can be received by the second battery B2. Hence, the ECU 7 controls a ratio between the electric power discharged from the first battery B1 and the electric power discharged from the second battery B2 so that the charging rate of the second battery B2 is maintained at a predetermined normal upper limit charging rate (e.g., about 50% to 80%) or lower during a travel of the vehicle V.

Next, an outline of charging/discharging control performed by the ECU 7 at execution of external charging using the first external charging unit 5 is explained. When the AC charger 51 of the first external charging unit 5 and an AC power supply source (not shown) are connected by a charging cable, it is possible for the ECU 7 to execute normal charging control, heater heating control, discharging heating control, and charging heating control, using the electric power supplied from the AC charger 51.

Figure 3A:
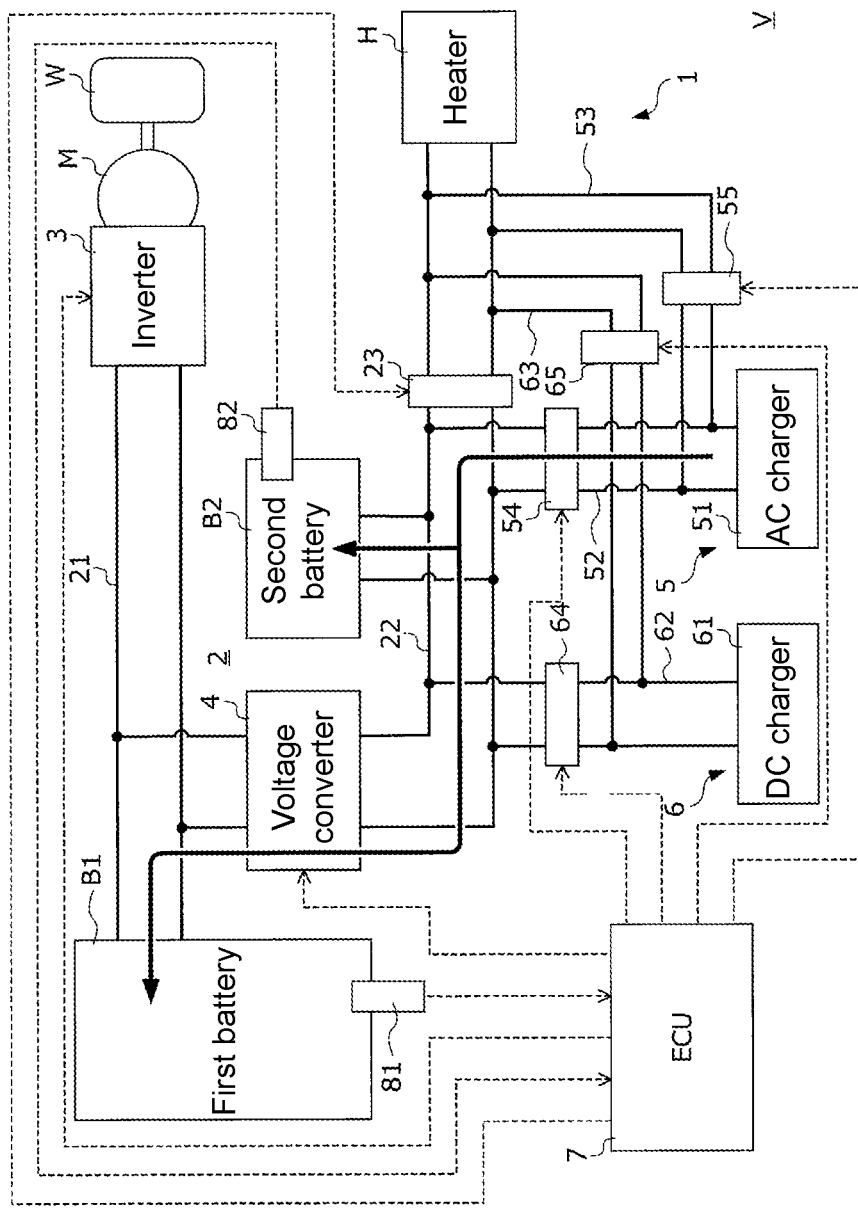
FIG. 3A schematically illustrates a flow of electric power at execution of normal charging control.

FIG. 3A schematically illustrates a flow of electric power at execution of the normal charging control.

In the normal charge control, the ECU 7 opens the heater contactor 23 and the heater feeding contactor 55 and closes the charging contactor 54. Accordingly, the electric power from the AC charger 51 is supplied to the second power line 22 via the charging line 52. Hence, in the normal charging control, the second battery B2 can be charged with the electric power supplied from the AC charger 51 to the second power line 22. Also, in the normal charging control, the ECU 7 drives the voltage converter 4, steps up the electric power at the second power line 22 and supplies it to the first power line 21, and charges the first battery B1 with the electric power at the first power line 21. As described above, in the normal charging control, the first battery B1 and the second battery B2 can be simultaneously charged with the electric power supplied from the AC charger 51.

Figure 3B:
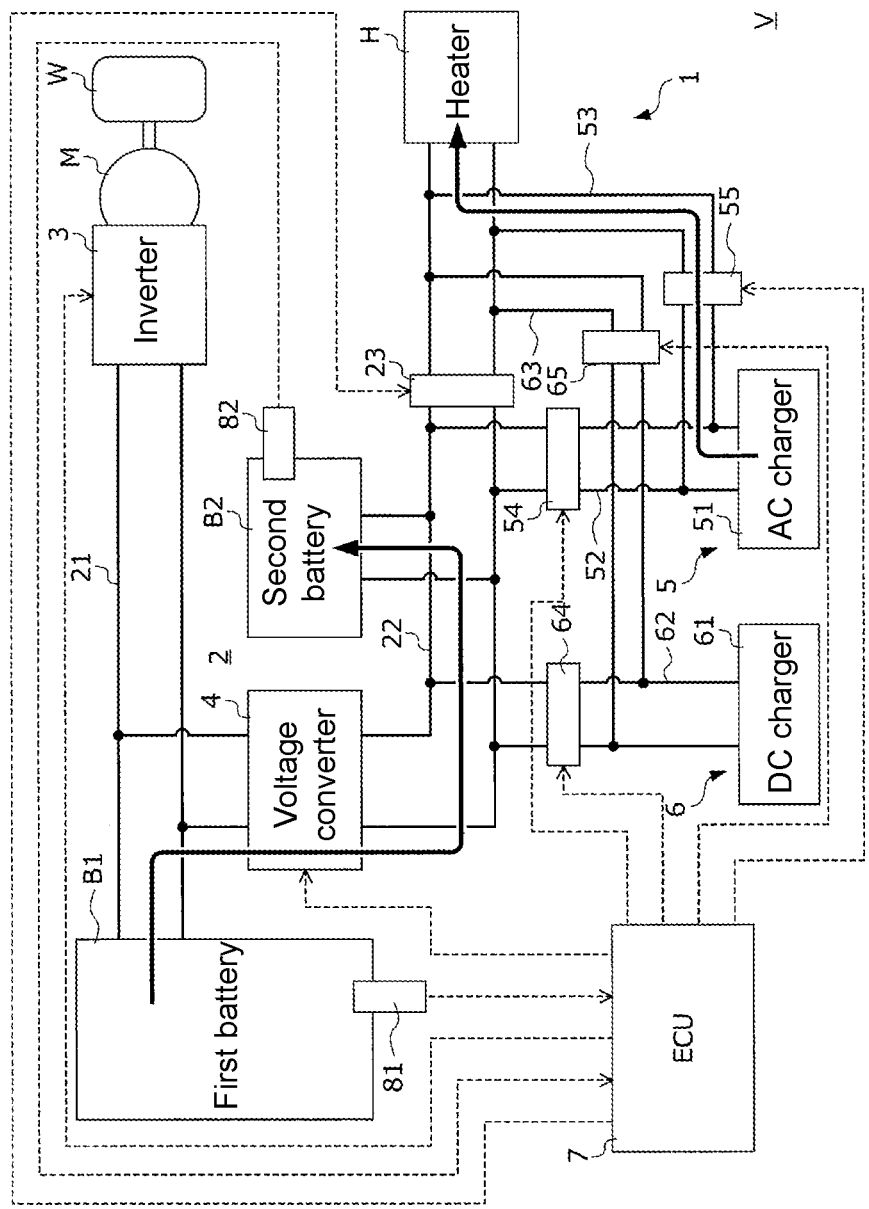
FIG. 3B schematically illustrates a flow of electric power in the case where heater heating control and discharging heating control are simultaneously executed.

FIG. 3B schematically illustrates a flow of electric power in the case where the heater heating control and the discharging heating control are simultaneously executed.

In the heater heating control, the ECU 7 opens the charging contactor 54 and the heater feeding contactor 23 and closes the heater feeding contactor 55. Accordingly, the AC charger 51 and heater H are connected via the heater feeding line 53. In addition, in the heater heating control, the ECU 7 drives the heater H with the electric power supplied from the AC charger 51, and externally heats the first battery B1 by the heat generated by the heater H. In the heater heating control, since the charging contactor 54 and the heater contactor 23 are open, the electric power outputted from the AC charger 51 is not consumed for charging the first battery B1 or the second battery B2. Hence, in the heater heating control, since as much electric power as possible can be supplied from the AC charger 51 to the heater H, it is possible to promptly heat the first battery B1.

Also, in the discharging heating control, the ECU 7 drives the voltage converter 4 with the heater contactor 23 open, steps down the electric power discharged from the first battery B1 to the first power line 21 and supplies it to the second power line 22, and charges the second battery B2 with the electric power at the second power line 22. Therefore, in the discharging heating control, electric power is discharged from the first battery B1 to the second battery B2 via the voltage converter 4, and the first battery B1 is internally heated by the heat generated by the internal resistance at the time of this discharging. As shown in FIG. 3B, the connection between the heater H and the second battery B2 and between the heater H and the voltage converter 4 are blocked by the heater contactor 23. Hence, the ECU 7 is capable of executing the heater heating control and the discharging heating control simultaneously and in parallel.

Figure 3C:
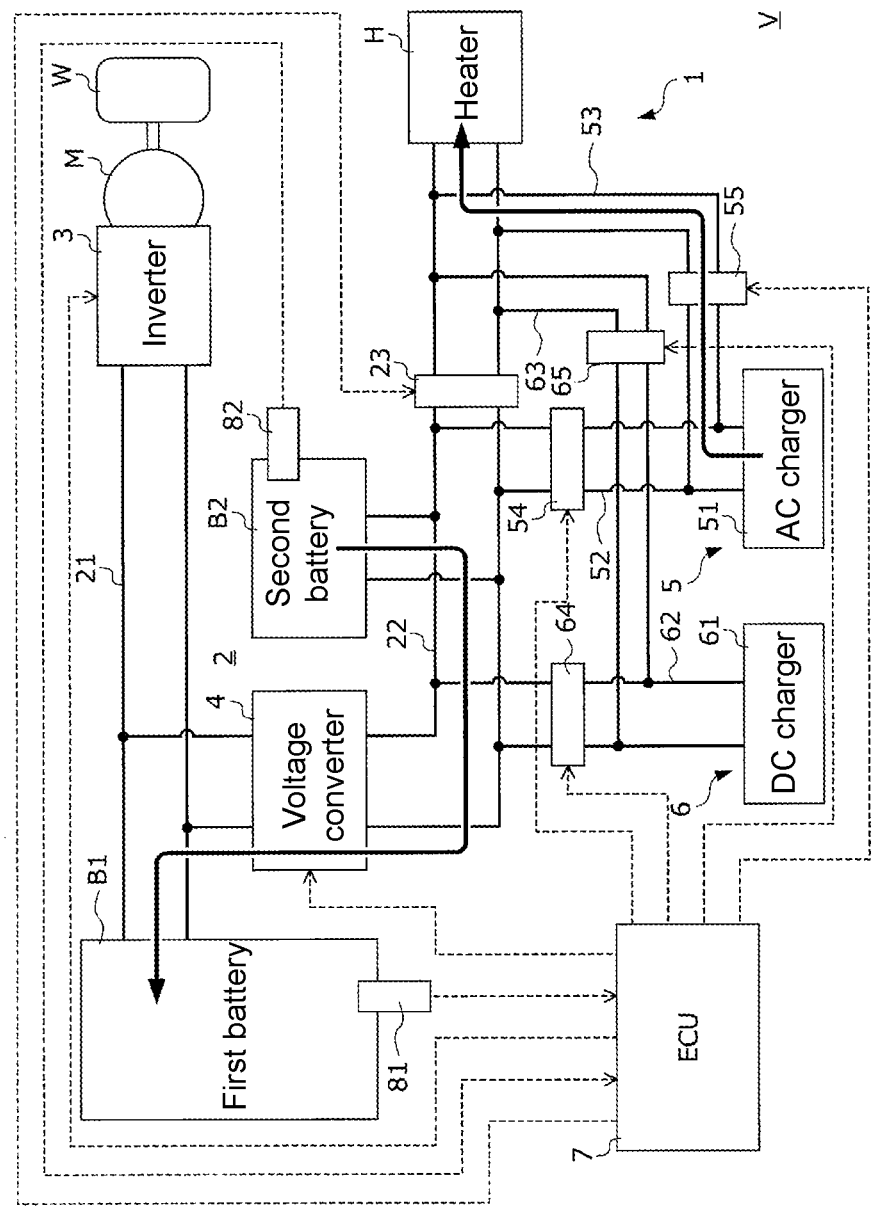
FIG. 3C schematically illustrates a flow of electric power in the case where heater heating control and charging heating control are simultaneously executed.

FIG. 3C schematically illustrates a flow of electric power in the case where the heater heating control and the charging heating control are simultaneously executed.

In the charging heating control, the ECU 7 drives the voltage converter 4 with the heater contactor 23 open, steps up the electric power discharged from the second battery B2 to the second power line 22 and supplies it to the first power line 21, and charges the first battery B1 with the electric power at the first power line 21. Therefore, in the charging heating control, electric power is discharged from the second battery B2 to the first battery B1 via the voltage converter 4, and the first battery B1 is internally heated by the heat generated by the internal resistance at the time of this charging. As shown in FIG. 3C, the connection between the heater H and the second battery B2 and between the heater H and the voltage converter 4 are blocked by the heater contactor 23. Hence, the ECU 7 is capable of executing the heater heating control and the charging heating control simultaneously and in parallel.

Moreover, the normal charging control, the heater heating control, the discharging heating control and the charging heating control as described above can also be executed during external charging using the second external charging unit 6. Since an execution procedure thereof may be as follows: the AC charger 51 is replaced with the DC charger 61, the charging line 52 is replaced with the charging line 62, the heater feeding line 53 is replaced with the heater feeding line 63, the charging contactor 54 is replaced with the charging contactor 64, and the heater feeding contactor 55 is replaced with the heater feeding contactor 65, illustration and detailed description thereof are omitted.

Figure 4:
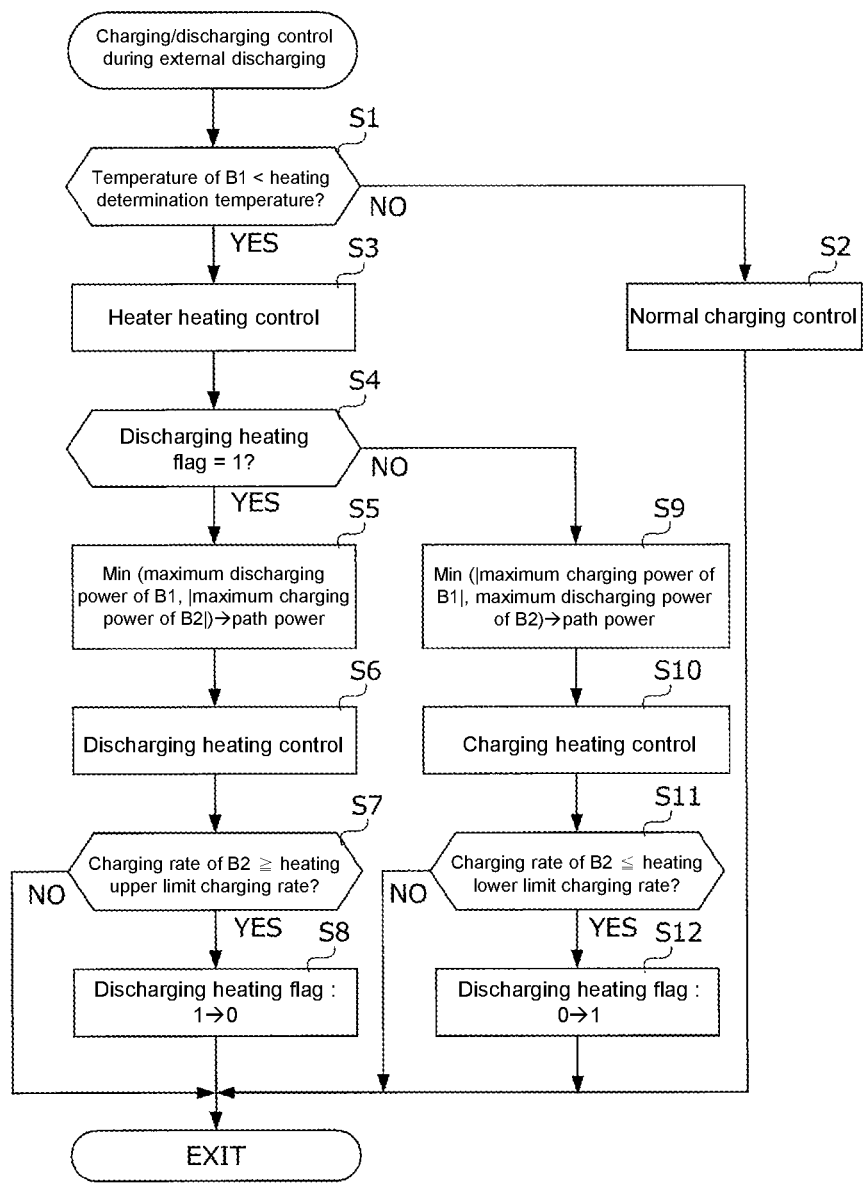
FIG. 4 is a flowchart showing a specific procedure of charging/discharging control processing executed in an ECU at execution of external charging using a first external charging unit.

FIG. 4 is a flowchart showing a specific procedure of charging/discharging control processing executed in the ECU 7 at execution of external charging using the first external charging unit 5. The charging/discharging control processing of FIG. 4 is repeatedly executed in the ECU 7 in a predetermined control cycle after the AC charger 51 of the first external charging unit 5 and the external AC power supply source are connected by the charging cable (not shown), until a predetermined charging completion condition (e.g., the charging rate of each of the first battery B1 and the second battery B2 exceeds a predetermined threshold) is satisfied.

Firstly, in S1, the ECU 7 determines whether or not the temperature of the first battery B1 is lower than a predetermined heating determination temperature. The heating determination temperature is a threshold set for the temperature of the first battery B1 to determine whether or not it is necessary to heat the first battery B1 when charging the first battery B1 with the electric power supplied from the AC charger 51. If a determination result of S1 is NO, i.e., if it can be determined that heating of the first battery B1 is unnecessary, the ECU 7 proceeds to S2, executes the normal charging control, and ends the processing of FIG. 4. Accordingly, as explained with reference to FIG. 3A, the first battery B1 and the second battery B2 are charged by the electric power supplied from the AC charger 51.

If the determination result of S1 is YES, i.e., if it can be determined that heating of the first battery B1 is necessary, the ECU 7 proceeds to S3. In S3, the ECU 7 executes the heater heating control and proceeds to S4. Accordingly, as explained with reference to FIG. 3B, the heater H is driven with the electric power supplied from the AC charger 51, and the first battery B1 is heated by the heat generated by the heater H.

In S4, whether or not a value of a discharging heating flag is "1" is determined. The discharging heating flag is a flag indicating that execution of the discharging heating control is required when the temperature of the first battery B1 is lower than the heating determination temperature, and may take a value of "0" or "1". That is, the fact that the value of the discharging heating flag is "1" means that execution of the discharging heating control is required; the fact that the value of the discharging heating flag is "0" means that execution of the charging heating control is required. An initial value of the discharging heating flag is set to, for example, "1". Accordingly, as explained below, if the temperature of the first battery B1 is lower than the heating determination temperature at the time when external charging is started, the discharging heating control can be executed first and then the charging heating control can be executed.

If a determination result of S4 is YES, i.e., if execution of the discharging heating control is required, the ECU 7 proceeds to S5. In S5, the ECU 7 acquires the maximum discharging power of the first battery B1 and the absolute value of the maximum charging power of the second battery B2, sets whichever smaller as path power, and proceeds to S6. The maximum discharging power of the first battery B1 and the maximum charging power of the second battery B2 are, for example, calculated by searching a map predetermined based on the charging rate or temperature of the first battery B1 and the second battery B2.

In S6, the ECU 7 executes the discharging heating control under the path power set in S5, and proceeds to S7. More specifically, the ECU 7 drives the voltage converter 4 so that the above path power passes through the voltage converter 4 and is supplied from the side of the first battery B1 to the side of the second battery B2. Accordingly, as explained with reference to FIG. 3B, the set path power is discharged from the first battery B1 to the second battery B2, and the first battery B1 is internally heated by the heat generated by the internal resistance at the time of this discharging.

In S7, the ECU 7 acquires the charging rate of the second battery B2, and determines whether or not the charging rate is equal to or higher than a heating upper limit charging rate (e.g., about 100%) set higher than the above normal upper limit charging rate. If a determination result of S7 is NO, the ECU 7 ends the processing of FIG. 4 while maintaining the value of the discharging heating flag at "1". If the determination result of S7 is YES, the ECU 7 ends the discharging heating control, determines that a timing for switching to the charging heating control has arrived and proceeds to S8, and after setting the value of the discharging heating flag from "1" to "0," ends the processing of FIG. 4.

In addition, if the determination result of S4 is NO, i.e., if execution of the charging heating control is required, the ECU 7 proceeds to S9. In S9, the ECU 7 acquires the absolute value of the maximum charging power of the first battery B1 and the maximum discharging power of the second battery B2, sets whichever smaller as path power, and proceeds to S10. The maximum charging power of the first battery B1 and the maximum discharging power of the second battery B2 are, for example, calculated by searching a map predetermined based on the charging rate or temperature of the first battery B1 and the second battery B2.

In S10, the ECU 7 executes the charging heating control under the path power set in S9, and proceeds to S11. More specifically, the ECU 7 drives the voltage converter 4 so that the above path power passes through the voltage converter 4 and is supplied from the side of the second battery B2 to the side of the first battery B1. Accordingly, as explained with reference to FIG. 3A, the set path power is discharged from the second battery B2 to the first battery B1, and the first battery B1 is internally heated by the heat generated by the internal resistance at the time of this charging.

In S11, the ECU 7 acquires the charging rate of the second battery B2, and determines whether or not the charging rate is equal to or lower than a heating lower limit charging rate (e.g., about 0%) set lower than the above normal upper limit charging rate. If a determination result of S11 is NO, the ECU 7 ends the processing of FIG. 4 while maintaining the value of the discharging heating flag at "0". If the determination result of S11 is YES, the ECU 7 ends the charging heating control, determines that a timing for switching to the discharging heating control has arrived and proceeds to S12, and after setting the value of the discharging heating flag from "0" to "1," ends the processing of FIG. 4.

To sum up, in the case where the temperature of the first battery B1 is lower than the heating determination temperature when external charging using the first external charging unit 5 is started, the ECU 7 firstly executes the heater heating control (see S3) and the discharging heating control (see S6) simultaneously. Accordingly, the first battery B1 is heated by the heat generated by the heater H and the heat generated by the internal resistance at the time of discharging. After that, when the charging rate of the second battery B2 exceeds the heating upper limit charging rate (see S7) due to continuous execution of the discharging heating control, the ECU 7 ends the discharging heating control and starts the charging heating control (see S10), while continuing the heater heating control. Accordingly, the first battery B1 is heated by the heat generated by the heater H and the heat generated by the internal resistance at the time of charging.

In addition, the ECU 7 repeatedly executes the discharging heating control and the charging heating control while executing the heater heating control, until the temperature of the first battery B1 becomes equal to or higher than the heating determination temperature. Then, when the temperature of the first battery B1 becomes equal to or higher than the heating determination temperature, the heater heating control, the discharging heating control and the charging heating control are ended, the normal charging control is started, and the first battery B1 and the second battery B2 are charged with the electric power supplied from the AC charger 51.

It is also possible to execute the charging/discharging control processing as described above during external charging using the second external charging unit 6. Since an execution procedure thereof may be as follows: the AC charger 51 is replaced with the DC charger 61, the charging line 52 is replaced with the charging line 62, the heater feeding line 53 is replaced with the heater feeding line 63, the charging contactor 54 is replaced with the charging contactor 64, and the heater feeding contactor 55 is replaced with the heater feeding contactor 65, illustration and detailed description thereof are omitted.

According to the power supply system 1 of the present embodiment, the following effects are achieved.

(1) In the power supply system 1, during execution of the heater heating control, the discharging heating control or the charging heating control is executed, and after the temperature of the first battery B1 becomes equal to or higher than the predetermined heating determination temperature, the first battery B1 is charged with the electric power supplied from the AC charger 51. Thus, in the power supply system 1, since the first battery B1 can be heated both internally and externally by simultaneously executing the heater heating control and any of the discharging heating control and the charging heating control, the charging capacity and discharging capacity of the first battery B1 can be promptly raised. In addition, according to the power supply system 1, by supplying the electric power from the AC charger 51 to the first battery B1 after the temperature of the first battery B1 has become equal to or higher than the heating determination temperature, in the heater heating control, the electric power supplied from the AC charger 51 can be largely supplied to the heater H. Thus, the first battery B1 can be promptly heated, and the charging capacity and discharging capacity of the first battery B1 can be promptly raised. Also, accordingly, the time required for charging the first battery B1 can be shortened.

(2) Since the capacity type first battery B1 has higher discharging capacity than charging capacity at a low charging rate where charging is required, the amount of heat generated by the internal resistance can be increased by performing discharging rather than charging, and the first battery B1 can be promptly heated. Thus, after firstly performing the discharging heating control that heats the first battery B1 by discharging electric power from the first battery B1 to the second battery B2, the ECU 7 performs the charging heating control that heats the first battery B1 by discharging electric power from the second battery B2 to the first battery B1 and charging the first battery B1. Accordingly, the temperature of the first battery B1 can be promptly raised to the heating determination temperature, and the time required for charging the first battery B1 can be shortened.

(3) In the power supply system 1, the discharging heating control and the charging heating control are repeatedly executed until the temperature of the first battery B1 reaches the heating determination temperature. Accordingly, since the first battery B1 can be continuously internally heated, the temperature of the first battery B1 can be promptly raised to the heating determination temperature, and the time required for charging the first battery B1 can be shortened.

(4) In the power supply system 1, during a travel of the vehicle V, the ECU 7 controls the charging/discharging amount of the second battery B2 so that the charging rate of the second battery B2 is maintained equal to or lower than the normal upper limit charging rate, and in the discharging heating control, the ECU 7 discharges electric power from the first battery B1 to the second battery B2 until the charging rate of the second battery B2 reaches the heating upper limit charging rate greater than the normal upper limit charging rate.

Accordingly, in the discharging heating control firstly performed as above, since the electric power discharged from the first battery B1 can be received by the second battery B2, the first battery B1 can be promptly heated.

The above has explained one embodiment of the disclosure, but the disclosure is not limited thereto. Details of the construction may be properly changed within the scope of spirit of the disclosure.

What is claimed is:

1. A power supply system of a vehicle, comprising
a first power storage device and a second power storage device, supplying electric power to a power source of the vehicle;
a heating device, consuming the electric power and heating the first power storage device;
a power circuit in which the first power storage device, the second power storage device and the heating device are provided;
an external power supply part, supplying electric power external to the vehicle to the power circuit;
a control device, controlling the power circuit and the external power supply part; and
a temperature acquisition unit, acquiring a temperature of the first power storage device, wherein
during execution of first heating control that heats the first power storage device with the heating device by driving the heating device with the electric power supplied from the external power supply part, the control device executes second heating control that heats the first power storage device by discharging electric power from one of the first power storage device and the second power storage device to the other of the first power storage device and the second power storage device, and charges the first power storage device with the electric power supplied from the external power supply part after the temperature of the first power storage device becomes equal to or higher than a predetermined temperature.

2. The power supply system of the vehicle according to claim 1, wherein
the first power storage device has lower output weight density and higher energy weight density than the second power storage device; and
in the second heating control, after firstly performing discharging heating control that heats the first power storage device by discharging electric power from the first power storage device to the second power storage device, the control device performs charging heating control that heats the first power storage device by discharging electric power from the second power storage device to the first power storage device and charging the first power storage device.

3. The power supply system of the vehicle according to claim 2, wherein, in the second heating control, the control device repeatedly executes the discharging heating control and the charging heating control until the temperature of the first power storage device becomes equal to or higher than the predetermined temperature.

4. The power supply system of the vehicle according to claim 3, wherein, during a travel of the vehicle, the control device controls charging/discharging of the second power storage device so that storage capacity of the second power storage device is maintained equal to or less than normal upper limit storage capacity, and in the discharging heating control, the control device discharges electric power from the first power storage device to the second power storage device until the storage capacity of the second power storage device reaches heating upper limit storage capacity greater than the normal upper limit storage capacity.

5. The power supply system of the vehicle according to claim 2, wherein, during a travel of the vehicle, the control device controls charging/discharging of the second power storage device so that storage capacity of the second power storage device is maintained equal to or less than normal upper limit storage capacity, and in the discharging heating control, the control device discharges electric power from the first power storage device to the second power storage device until the storage capacity of the second power storage device reaches heating upper limit storage capacity greater than the normal upper limit storage capacity.

* * * * *